B. H. AND F. L. CALKIN.
COFFEE PERCOLATOR.
APPLICATION FILED MAR. 30, 1915.
1,389,239.      Patented Aug. 30, 1921.
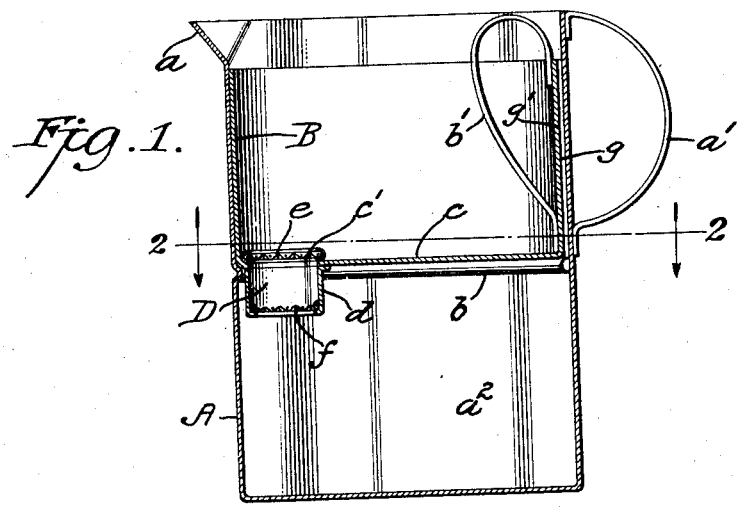
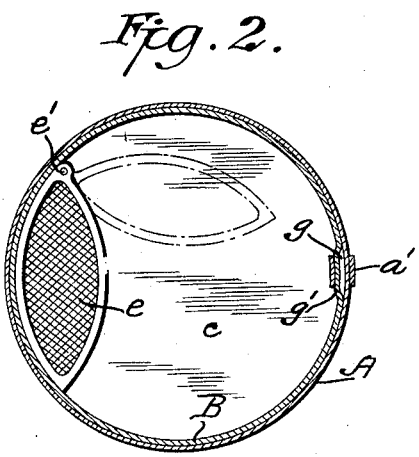

UNITED STATES PATENT OFFICE.

BENJAMIN H. CALKIN AND FRANCES L. CALKIN, OF DETROIT, MICHIGAN; SAID BENJAMIN H. CALKIN ASSIGNOR TO SAID FRANCES L. CALKIN.

COFFEE-PERCOLATOR.

1,389,239.

Specification of Letters Patent.

Patented Aug. 30, 1921.

Application filed March 30, 1915. Serial No. 18,014.

*To all whom it may concern:*

Be it known that we, BENJAMIN H. CALKIN and FRANCES L. CALKIN, subjects of the King of Great Britain, residing at Detroit, county of Wayne, and State of Michigan, have invented a certain new and useful Coffee-Percolator, of which the following is a specification.

This invention is a percolator for preparing liquid extracts, and although the invention is useful in the preparation of extracts generally, it is intended especially to be used for producing a beverage from ground coffee.

It is well known that a coffee beverage is most palatable when consumed almost immediately after its production, hence the common practice followed in restaurants, cafes, etc., of preparing large quantities of coffee beverage and storing the same for an indefinite time before dispensing is not conducive to serving a palatable beverage for many reasons, one of which is the oxidation of the beverage due to the contact of air, more or less, with it but chiefly to the stratification of the beverage, the lighter ingredients rising to the top and the heavier at the bottom.

According to this invention, a simple and efficient percolator capable of economical manufacture is sought to be produced. The percolator is novel in several structural particulars, a salient feature consisting of a storage chamber, the liquid outlet from and the liquid inlet to which chamber is through or by means of the receptacle for holding the ground coffee berry, whereby a double percolation is secured as the liquid flows back and forth through the coffee and during the operation of pouring off the liquid beverage it is mechanically clarified by directing its line of flow through the ground coffee, the latter acting as a filtering medium so as to result in a clear strong palatable beverage.

More specifically stated, the percolator of our invention comprises a vessel provided with a pouring lip, said vessel being free from the usual pouring tube and spout, a second vessel of smaller capacity positioned within the upper part of the first vessel, the bottom of said second vessel operating to produce two chambers, i. e. a bottom chamber and an upper chamber, and a coffee container carried by the bottom portion of the second vessel, said coffee container having a foraminous top and a foraminous bottom so that the coffee container operates to secure the double function of means for holding the ground coffee and as means for the flow of liquid into and out of the bottom chamber of the first vessel. After the ground coffee is placed in the container and the second vessel is introduced within the first vessel, hot water is poured into the second vessel so as to flow or percolate through the coffee within the container and to accumulate within the bottom chamber, which flow of liquid through the coffee extracts some of the desirable essences from it and results in the absorption by the coffee of some of the liquid, thus causing the ground coffee to swell or expand within the container. Now, as the outer vessel is free from a pouring tube or spout, the liquid extract when poured off is required to flow from the lower chamber through the coffee container and the ground coffee therein, and thence through the upper chamber to the spout of the outer vessel, during which backward flow of the liquid through the ground coffee more of the essential oils are extracted from the ground coffee and the liquid is clarified, whereby we are able to produce within a minute or two one or more cups of strong, clear, palatable coffee beverage.

Other features and advantages of the invention will be apparent from the following detailed description.

In the drawings,

Figure 1 is a vertical section through a percolator embodying our invention.

Fig. 2 is a horizontal section on the line 2—2 of Fig. 1.

A designates a vessel which is open at the top and closed at the bottom. Said vessel is shown as being provided with a pouring lip *a* and a handle *a'*. The vessel A is provided, furthermore, with a horizontal ledge or shoulder *b* positioned intermediate the ends of said vessel; said ledge or shoulder may be, and preferably is, formed by a bead extending horizontally around the vessel.

B designates a second vessel, the same being positioned removably within vessel A and adapted to rest upon the ledge or shoulder *b* thereof, whereby said vessel B is supported within the vessel A and is removable at will therefrom. The interior vessel B is provided with a handle $b'$ of any suitable construction for introducing and removing the vessel B relatively to vessel A. The bottom $c$ of the interior vessel B is provided with an opening $c'$, the position of said opening being shown in Figs. 1 and 2. The opening $c'$ is provided in the bottom $c$ near one edge thereof so that in pouring the liquid extract out of the percolator it will flow through the opening $c'$ and thence to the pouring lip $a$ of the vessel A.

D designates a perforated container within which is placed the charge of material from which the extract is to be prepared. Said container D may be of any construction suitable for the purpose intended, but it is shown in the drawings as consisting of a box $d$, a foraminous head $e$ and a foraminous bottom $f$. The top $e$ and bottom $f$ are composed, preferably, of wire gauze, although perforated metal may be substituted for the gauze material. As shown, the box $d$ of the container is attached to the bottom $c$ of the interior vessel, said box depending from the bottom $c$. The foraminous material $f$ is fitted removably within the box $d$ so that the box and the screen material may be cleaned with facility. The box of the container is attached to the bottom of the inner receptacle so as to be removable with said inner receptable and to be insertible therewith relatively to the outer vessel A. If desired, the container may be detachably connected to the bottom of the removable vessel. As shown, however, the box $d$ of the container is fixedly attached to the bottom of the vessel B and the upper strainer $e$ is pivotally connected by a pin $e'$ to the bottom $c$ of the inner vessel B, whereby the upper strainer $e$ may be turned to the dotted line position of Fig. 2, for the purpose of placing the material within the container D or of removing the used material from said container as desired.

Our device is intended to be used more particularly for quickly preparing a small quantity of coffee beverage. In preparing the beverage we proceed as follows:—With the inner vessel B removed from the outer vessel A, the container D is opened and a proper quantity of ground coffee is deposited within said container, after which the latter is closed. The vessel B with the container attached thereto is now inserted into the vessel A until the bottom $c$ of said vessel B is in contact with the horizontal ledge or shoulder $b$, the latter operating to arrest the further inward movement of the vessel B, whereby the container and the vessel B are spaced with respect to the bottom of the vessel A. A desired quantity of hot water is now poured into vessel B, the water flowing through the container D, the strainers $e$ $f$ thereof and the material. The water flows into contact with the material, taking up some of the essential oils, and accumulates in the chamber $a^2$ of vessel A. The material within the container absorbs moisture and expands or swells so as to substantially fill the chamber of the container and to be brought into contact with the screens $e$ $f$. The vessel A is not provided with the tube or pouring spout like other percolators or coffee pots, and in our invention the liquid beverage within the chamber $a^2$ of the outer vessel A must be poured through the container D and the vessel B. The container D thus constitutes the liquid inlet to, and the liquid outlet from, the chamber $a^2$ of vessel A, and thus the liquid is adapted to flow and reflow through the container and the material therein. This operation is advantageous for two reasons; first, in pouring the liquid out of the chamber $a^2$ it must flow into contact with the material present in the container D, thus further carrying on the process of extracting the essential oils from the material and, second, the reflow of the liquid beverage through and into contact with the material and the screens $e$ $f$ of the container operate to mechanically clarify the liquid beverage and free it from sediment, it being recalled that the ground coffee becomes expanded within the container so that the liquid beverage will filter through the material and the screens of the container.

Briefly stated, the operation involves the pouring of water into vessel B so that it will flow through container D and accumulate in the chamber $a^2$ of the outer vessel; the percolator is then decanted, or substantially inverted, so that the liquid beverage in the chamber $a^2$ will flow back through the container and through the inner vessel B and thence out of the spout $a$ into the cup or other receptacle.

It is apparent that the operation of charging the container and of pouring the water and repouring the liquid may be carried out easily and quickly so as to prepare a liquid beverage within a very brief time, which beverage is in a palatable condition and may be at once served to the customer. The inner vessel with the attached container is easily removed from the outer vessel and access thus obtained to the container for removing the used coffee and thoroughly cleaning the parts.

When hot liquid is in chamber $a^2$ of the outer vessel it is in a steaming condition, and to provide for the outlet of air and of steam we construct the vessels A B so that a vertical passage $g$ is produced between the opposing walls of the two vessels. The inner vessel B is shown as having an offset $g'$ in the vertical wall thereof, and when the vessel B is positioned within vessel A, the offset coöperates with the vessel A so as to produce the passage $g$ through which air can escape when liquid flows into the chamber $a^2$, said passage operating, also, as a vent for the steam which arises from the hot liquid within said chamber $a^2$.

From the foregoing description taken in connection with the drawings it will be seen that we have provided a very simple percolator by which a small quantity of liquid beverage can be easily and quickly prepared, the entire device being economical of manufacture.

Having thus fully described the invention, what we claim as new and desire to secure by Letters Patent is:

1. A percolator comprising a vessel provided intermediate its ends with a shoulder, a second vessel fitted removably within the first vessel and in contact with the shoulder thereof, the bottom portion of said vessel having an opening, and a container for the charge of material, said container having a foraminous top and a foraminous bottom and said container being positioned in register with said opening in the second vessel so as to constitute the liquid inlet to and the liquid outlet from the chamber of the first vessel, whereby the liquid is adapted to flow and reflow through the container and the charge of material in passing into and out the chamber of said first vessel.

2. A percolator comprising a vessel, a second vessel positioned within said first vessel, said vessels being relatively assembled to produce between their walls a passage forming a steam and air outlet from the chamber of the first vessel, the bottom of said second vessel being provided with an opening, and a foraminous container for a charge of material, positioned in register with said opening of the second vessel, said container constituting the liquid outlet from and the liquid inlet to the chamber of the first vessel so that the liquid is adapted to flow and reflow through the container and its charge of material when passing into and out of the chamber of the first vessel.

In testimony whereof we have signed our names to this specification in the presence of two subscribing witnesses.

BENJAMIN H. CALKIN.
FRANCES L. CALKIN.

Witnesses:
R. J. WETCHER,
R. C. KNAPP.